(12) United States Patent
Small et al.

(10) Patent No.: US 9,811,786 B2
(45) Date of Patent: Nov. 7, 2017

(54) RESERVATIONS-BASED INTELLIGENT ROADWAY TRAFFIC MANAGEMENT

(71) Applicant: AT&T Intellectual Property I, L.P., Atlanta, GA (US)

(72) Inventors: David B. Small, Dublin, CA (US); Thomas Spencer, IV, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/883,693

(22) Filed: Oct. 15, 2015

(65) Prior Publication Data

US 2017/0109659 A1    Apr. 20, 2017

(51) Int. Cl.
| | |
|---|---|
| *G08G 1/00* | (2006.01) |
| *G06Q 10/02* | (2012.01) |
| *G08G 1/09* | (2006.01) |
| *G05D 1/00* | (2006.01) |
| *G08G 1/16* | (2006.01) |

(52) U.S. Cl.
CPC ............ *G06Q 10/02* (2013.01); *G05D 1/0088* (2013.01); *G08G 1/09* (2013.01); *G08G 1/16* (2013.01)

(58) Field of Classification Search
CPC ............ G06Q 10/02; G08G 1/09; G08G 1/16; G05D 1/00
USPC .......................................... 701/117, 25, 450
See application file for complete search history.

(56) References Cited

U.S. PATENT DOCUMENTS

| | | | |
|---|---|---|---|
| 6,496,773 B1 | 12/2002 | Olsson | |
| 7,941,267 B2 * | 5/2011 | Adamczyk | ............ G01C 21/00 340/434 |
| 8,090,489 B2 * | 1/2012 | Delean | ................... G08G 1/202 340/468 |
| 8,233,919 B2 | 7/2012 | Haag et al. | |
| 8,855,904 B1 | 10/2014 | Templeton et al. | |
| 8,954,261 B2 | 2/2015 | Das et al. | |
| 8,996,226 B1 * | 3/2015 | Chatham | ............ G08G 1/09626 701/117 |
| 9,043,124 B1 | 5/2015 | Tran et al. | |
| 2009/0322563 A1 | 12/2009 | Stadtmiller et al. | |
| 2013/0018572 A1 | 1/2013 | Jang | |
| 2014/0267734 A1 | 9/2014 | Hart, Jr. et al. | |
| 2014/0278029 A1 | 9/2014 | Tonguz et al. | |
| 2014/0278052 A1 | 9/2014 | Slavin et al. | |
| 2014/0330479 A1 | 11/2014 | Dolgov et al. | |

(Continued)

*Primary Examiner* — Thomas G Black
*Assistant Examiner* — Luke Huynh
(74) *Attorney, Agent, or Firm* — Hartman & Citrin LLC

(57) ABSTRACT

Concepts and technologies disclosed herein are directed to reservations-based intelligent roadway traffic management. According to one aspect disclosed herein, a roadway usage management ("RUM") system can receive, from a user device, a reservation request. The RUM system can extract, from the reservation request, a route to a destination location. The route can include a roadway segment to be used by a user vehicle for travel to the destination location. The RUM system can determine a time block during which entry to the roadway segment is available. The RUM system can generate a reservation response that includes the time block available to satisfy the reservation request and can send the reservation response to the user device. The user vehicle can be a partially autonomous vehicle or a fully autonomous vehicle.

20 Claims, 11 Drawing Sheets

(56) References Cited

U.S. PATENT DOCUMENTS

2014/0350831 A1* 11/2014 Hoffman ............... G06Q 10/00
                                                701/117
2015/0134232 A1    5/2015 Robinson
2015/0219463 A1*  8/2015 Kang .................... G08G 1/143
                                                701/117

* cited by examiner

RESERVATIONS-BASED INTELLIGENT ROADWAY TRAFFIC MANAGEMENT

BACKGROUND

In recent years, the automotive industry has made great strides in incorporating various technologies that allow vehicles to operate, at times, in an autonomous way. For example, technologies exist that allow vehicles to maintain lane and to actively intervene should the driver fail to maintain lane without first signaling; technologies exist that allow vehicles to park automatically; and technologies exist that allow vehicles to adjust cruise control speed in order to maintain a pre-defined distance from other vehicles. These technologies are all assistance technologies that inspire driver confidence and ultimately provide safer roadways. The automotive industry and even technology companies, such as GOOGLE, are also researching ways to offer fully autonomous vehicles. By eliminating the human element in control, a roadway of exclusively autonomous vehicles could drastically decrease the number of accidents, the severity of accidents, and could even eliminate automobile accident-related deaths. Autonomous vehicles can enable safe transport for individuals with diminished driver skills due to age, disease, or other factors. Autonomous vehicles can also reduce or perhaps eliminate the need for roadway patrol, reduce roadway maintenance requirements, reduce travel times for commuters, and reduce automotive emissions.

SUMMARY

Concepts and technologies disclosed herein are directed to reservations-based intelligent roadway traffic management. According to one aspect disclosed herein, a roadway usage management ("RUM") system can receive, from a user device, a reservation request. The RUM system can extract, from the reservation request, a route to a destination location. The route can include a roadway segment to be used by a user vehicle for travel to the destination location. The RUM system can determine a time block during which entry to the roadway segment is available. The RUM system can generate a reservation response that includes the time block available to satisfy the reservation request and can send the reservation response to the user device. The user vehicle can be a partially autonomous vehicle or a fully autonomous vehicle.

In some embodiments, the RUM system can receive an acceptance of the reservation response or a denial of the reservation response from the user device. In some embodiments, the RUM system can include a roadway usage database that stores a roadway segment identifier that identifies the roadway segment. The time block can be associated with the roadway segment identifier in the roadway usage database. The time block also can be associated with a reservation capacity. The RUM system can, in response to receiving an acceptance of the reservation response, mark, in the roadway usage database, the time block as reserved. The RUM system can generate a reservation certificate to be utilized by the user device to enter the roadway segment during the time block. The RUM system can send the reservation certificate to the user device.

In some embodiments, the roadway usage database also stores one or more fees associated with the time block. The fees can include a reservation fee for when a reservation is placed. The fees additionally or alternatively can include a reservation usage fee for when the reservation is redeemed using the reservation certificate. Other fees are contemplated.

In some embodiments, the roadway usage database also stores an adhoc capacity for the roadway segment. The RUM system can receive, from a further user device, an adhoc entry request for entry to the roadway segment. The RUM system can determine whether the adhoc capacity can accommodate the adhoc entry request. In response to determining that the adhoc capacity can accommodate the adhoc entry request, the RUM system can generate an adhoc entry response. The adhoc entry response can include a grant of access to the roadway segment or a denial of access to the roadway segment. The RUM system can send the adhoc entry response to the user device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
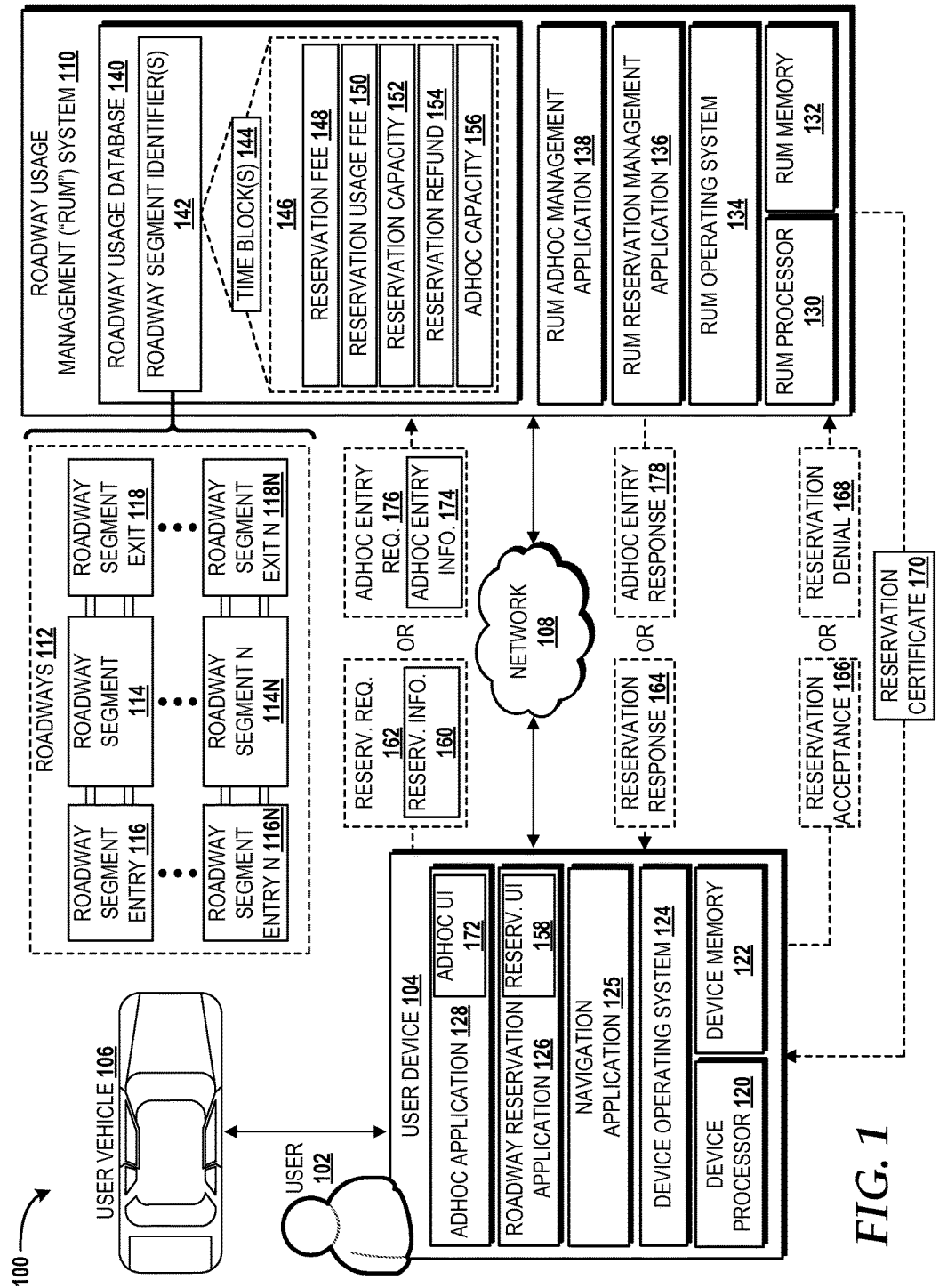
FIG. 1 is a block diagram illustrating aspects of an illustrative operating environment for various concepts disclosed herein.

Concepts and technologies disclosed herein are directed to reservations-based intelligent roadway traffic management. According to one aspect disclosed herein, a roadway usage management ("RUM") system can receive, from a user device, a reservation request. The RUM system can extract, from the reservation request, a destination location and an arrival time to the destination location. The RUM system can generate a reservation response that includes the time block available to satisfy the reservation request and can send the reservation response to the user device.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of reservations-based intelligent roadway traffic management will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a user 102 who is associated with a user device 104 and a user vehicle 106. The user device 104 is operating in communication with and/or as part of a communications network ("network") 108 to communicate with a roadway usage management ("RUM") system 110 to reserve usage of one or more roadways 112.

According to various embodiments, the functionality of the user device 104 may be provided by one or more mobile telephones, smartphones, tablet computers, slate computers, smart watches, fitness devices, smart glasses (e.g., the GOOGLE GLASS family of products), other wearable devices, mobile media playback devices, set top devices, navigation devices, laptop computers, notebook computers, ultrabook computers, netbook computers, server computers, computers of other form factors, computing devices of other form factors, other computing systems, other computing devices, and/or the like. It should be understood that the functionality of the user device 104 can be provided by a single device, by two or more similar devices, and/or by two or more dissimilar devices.

Moreover, the user device 104 can be independent of the user vehicle 106 or integrated with the user vehicle 106. In some embodiments, the user device 104 is configured to communicate with the user vehicle 106 via a wired connection such as universal serial bus ("USB") or via a wireless connection such as BLUETOOTH. In some other embodiments, the user device 104 is integrated within the user vehicle 106 such as part of a vehicle entertainment system (not shown; also commonly referred to as "infotainment"), a vehicle navigation system, a vehicle engine control unit ("ECU"), and/or another computing system of the user vehicle 106. The user device 104 may be retrofitted into the user vehicle 106 as aftermarket equipment or may be made available as standard or optional original equipment manufacturer ("OEM") equipment of the user vehicle 106.

The user vehicle 106 can be a car, truck, van, motorcycle, moped, go-kart, golf cart, or any other ground-based vehicle configured to transport one or more passengers and/or cargo in at least a partially autonomous control mode. The user vehicle 106 can be a partially or fully autonomous vehicle. In some embodiments, the user vehicle 106 can operate as a Level 3 or Level 4 vehicle as defined by the National Highway Traffic Safety Administration ("NHTSA"). The NHTSA defines a Level 3 vehicle as a limited self-driving automation vehicle that enables a driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. The GOOGLE car, available from GOOGLE, is an example of a limited self-driving automation vehicle. The NHTSA defines a Level 4 vehicle as a full self-driving automation vehicle that is designed to perform all safety-critical driving functions and monitor roadway conditions for an entire trip to a destination. Such a design anticipates that the driver will provide destination or navigation input, but is not expected to be available for control at any time during the trip. This includes both occupied and unoccupied vehicles.

The network 108 can be or can include one or more wireless wide area networks ("WWANs"), which may, in turn, include one or more core networks such as a circuit-switched core network ("CS CN"), a packet-switched core network ("PS CN"), an IP multimedia subsystem ("IMS") core network, multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies (e.g., 802.11 WI-FI), and the like. The network 108 can include one or more radio access networks ("RANs"). A RAN can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the user device 104. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

The user device 104 and the RUM system 110 can communicate over the network 108 to make reservations for travel, by the user 102 in the user vehicle 106, of at least a portion of the roadways 112. Each of the roadways 112 can be divided into one or more roadway segments 114-114N, which can include any length of roadway having any roadway surface type (e.g., asphalt, concrete, composite, rubber, recycled material, dirt, brick, rock, and the like), and can be or can include one or more structures (e.g., fixed or movable bridges). Each of the roadway segments 114-114N can include a roadway segment entry (illustrated as roadway segment entries 116-116N) and a roadway segment exit (illustrated as roadway segment exits 118-118N). The roadway segment entries 116-116N can define entry points to the roadways segments 114-114N. The roadway segment exits 118-118N can define exit points from the roadway segments 114-114N. A reservation for travel can identify one or more of the roadway segment entries 116-116N and one or more of the roadway segment exits 118-118N along a travel route.

The illustrated user device 104 includes a device processor 120, a device memory 122, a device operating system 124, a navigation application 125, a roadway reservation application 126, and an adhoc application 128. The device processor 120 can include one or more hardware components that perform computations to process data, and/or to execute computer-executable instructions of one or more application programs such as the navigation application 125, the roadway reservation application 126, the adhoc application 128, one or more operating systems such as the device operating system 124, and/or other software. The device processor 120 can include one or more central processing units ("CPUs") configured with one or more processing cores. The device processor 120 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the device processor 120 can include one or more discrete GPUs. In some other embodiments, the device processor 120 can include CPU and GPU components that are configured in accordance with a co-processing CPU/GPU computing model, wherein the sequential part of an application executes on the CPU and the computationally-intensive part is accelerated by the GPU. The device processor 120 can include one or more system-on-chip ("SoC") components along with one or more other components illustrated as being part of the user device 104, including, for example, the device memory 122. In some embodiments, the device processor 120 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The device processor 120 can be or can include one or more hardware components architected in accordance with an ARM architecture, available for license from ARM HOLDINGS of Cambridge, United Kingdom. Alternatively, the device processor 120 can be or can include one or more hardware components architected in accordance with an x86 architecture, such an architecture available from INTEL CORPORATION of Mountain View, Calif., and others. Those skilled in the art will appreciate the implementation of the device processor 120 can utilize various computation architectures, and as such, the device processor 120 should not be construed as being limited to any particular computation architecture or combination of computation architectures, including those explicitly disclosed herein.

The device memory 122 can include one or more hardware components that perform storage operations, including temporary or permanent storage operations. In some embodiments, the device memory 122 includes volatile and/or non-volatile memory implemented in any method or technology for storage of information such as computer-readable instructions, data structures, program modules, the device operating system 124, the navigation application 125, the roadway reservation application 126, the adhoc application 128 or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the device processor 120.

The device operating system 124 can control the operation of the user device 104. In some embodiments, the device operating system 124 includes the functionality of the navigation application 125, the roadway reservation application 126 and/or the adhoc application 128, all of which are described in greater detail below. The device operating system 124 can be executed by the device processor 120 to cause the user device 104 to perform various operations. The device operating system 124 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The navigation application 125, the roadway reservation application 126 and the adhoc application 128 can execute on top of the device operating system 124. The navigation application 125, the roadway reservation application 126 and the adhoc application 128 can be executed by the device processor 120 to cause the user device 104 to perform various operations described herein. Additional details regarding the navigation application 125, roadway reservation application 126 and the adhoc application 128 will be described herein below.

According to various embodiments, the functionality of the RUM system 110 may be provided by one or more mobile telephones, smartphones, tablet computers, slate computers, smart watches, fitness devices, smart glasses (e.g., the GOOGLE GLASS family of products), other wearable devices, mobile media playback devices, set top devices, navigation devices, laptop computers, notebook computers, ultrabook computers, netbook computers, server computers, computers of other form factors, computing devices of other form factors, other computing systems, other computing devices, and/or the like. It should be understood that the functionality of the RUM system 110 can be provided by a single device, by two or more similar devices, and/or by two or more dissimilar devices.

The illustrated RUM system 110 includes a RUM processor 130, a RUM memory 132, a RUM operating system 134, a RUM reservation management application 136, a RUM adhoc management application 138, and a roadway usage database 140. The RUM processor 130 can include one or more hardware components that perform computations to process data, and/or to execute computer-executable instructions of one or more application programs such as the RUM adhoc management application 138, RUM reservation management application 136, one or more operating systems such as the RUM operating system 134, and/or other software. The device processor can include one or more CPUs configured with one or more processing cores. The RUM processor 130 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the RUM processor 130 can include one or more discrete GPUs. In some other embodiments, the RUM processor 130 can include CPU and GPU components that are configured in accordance with a co-processing CPU/GPU computing model, wherein the sequential part of an application executes on the CPU and the computationally-intensive part is accelerated by the GPU. The RUM processor 130 can include one or more SoC components along with one or more other components illustrated as being part of the RUM system 110, including, for example, the RUM memory 132. In some embodiments, the RUM processor 130 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP) SoCs, available from TEXAS INSTRUMENTS of Dallas, Tex.; one or more customized versions of any of the above SoCs; and/or one or more proprietary SoCs. The RUM processor 130 can be or can include one or more hardware components architected in accordance with an ARM architecture, available for license from ARM HOLDINGS of Cambridge, United Kingdom. Alternatively, the RUM processor 130 can be or can include one or more hardware components architected in accordance with an x86 architecture, such an architecture available from INTEL CORPORATION of Mountain View, Calif., and others. Those skilled in the art will appreciate the implementation of the RUM processor 130 can utilize various computation architectures, and as such, the RUM processor 130 should not be construed as being limited to any particular computation architecture or combination of computation architectures, including those explicitly disclosed herein.

The RUM memory 132 can include one or more hardware components that perform storage operations, including temporary or permanent storage operations. In some embodiments, the RUM memory 132 includes volatile and/or non-volatile memory implemented in any method or technology for storage of information such as computer-readable instructions, data structures, program modules, the RUM operating system 134, the RUM reservation management application 136, the RUM adhoc management application 138, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the RUM processor 130.

The RUM operating system 134 can control the operation of the RUM system 110. In some embodiments, the RUM operating system 134 includes the functionality of RUM reservation management application 136 and/or the RUM adhoc management application 138, both of which are described in greater detail below. The RUM operating system 134 can be executed by the RUM processor 130 to cause the RUM system 110 to perform various operations. The RUM operating system 134 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the OS X family of operating systems or a member of the IOS family of operating systems from APPLE INC., a member of the ANDROID OS family of operating systems or a member of the CHROME OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The RUM reservation management application 136 and the RUM adhoc management application 138 can execute on top of the RUM operating system 134. The RUM reservation management application 136 and the RUM adhoc management application 138 can be executed by the RUM processor 130 to cause the RUM system 110 to perform various operations described herein. Additional details regarding the RUM reservation management application 136 and the RUM adhoc management application 138 will be described herein below.

The roadway usage database 140 can store one or more roadway segment identifiers 142, each of which identifies one of the roadway segments 114-114N. The roadway segment identifier(s) 142 can be or can include any combination of letters, numbers, symbols, and/or characters. The RUM system 110 can assign the roadway segment identifier(s) 142 in accordance with any scheme to differentiate among representations of the roadway segments 114-114N in the roadway usage database 140. The RUM system 110 can assign the roadway segment identifier(s) 142 based upon input from an operator (not shown). For example, the operator can manually enter information associated with the roadway segments 114-114N. The RUM system 110 additionally or alternatively can assign the roadway segment identifier(s) 142 automatically based upon a sequential naming convention, whereby each new roadway segment identifier added to the roadway usage database 140 is incremented. For example, a first roadway segment of a given roadway might be identified as <ROADWAY_NAME, SEGMENT_1> or similar, and a second roadway segment of the same roadway might be identified as <ROADWAY_NAME, SEGMENT_2>. These examples are merely illustrative and should not be construed as being limiting in any way.

A given roadway segment identified by one of the roadway segment identifiers 142 can be associated one or more time blocks 144. The time blocks 144 can include any increment of time (e.g., days, hours, minutes, and/or seconds) and can represent periods of time during which usage of a corresponding roadway segment is available. Each of the time blocks 144 can be associated with additional information 146 or a portion thereof. The additional information 146 can include a reservation fee 148, a reservation usage fee 150, a reservation capacity 152, a reservation refund 154, and an adhoc capacity 156.

The reservation fee 148 can include a fee to be charged to a user, such as the user 102, when he or she makes a reservation to utilize one or more of the roadways 112, and more particularly, one or more of the roadway segments 114-114N. It is contemplated that the reservation fee 148 can be a fixed fee for any of the time blocks 144 or can be an adjustable fee that adjusts according to other factors, including, for example, the reservation capacity 152. In other words, the reservation fee 148 for a given time block 144 can be set to a lowest value when the corresponding reservation capacity 152 is at its highest possible value, and can be adjusted higher as the corresponding reservation capacity 152 decreases. It also is contemplated that none, some, or all of the time blocks 144 might include a zero value for the reservation fee 148. The reservation refund 154 can identify whether a refund is available and, if so, the amount of the refund, including partial and full refunds, should the user 102 decide not to utilize a reservation.

The reservation usage fee 150 can include a fee to be charged to the user 102 when he or she redeems (uses) his or her reservation to utilize the roadways 112, and more particularly, one or more of the roadway segments 114-114N. It is contemplated that the reservation usage fee 150 can be a fixed fee for any of the time blocks 144 or can be an adjustable fee that adjusts according to other factors, including, for example, the reservation capacity 152. In other words, the reservation usage fee 150 for a given time block 144 can be set to a lowest value when the corresponding reservation capacity 152 is at its highest possible value, and can be adjusted higher as the corresponding reservation capacity 152 decreases. It also is contemplated that none, some, or all of the time blocks 144 might include a zero value for the reservation usage fee 150.

The reservation capacity 152 can include a maximum number of reservations available for vehicles, such as the user vehicle 106, to travel along a corresponding one of the roadway segments 114-114N for the associated one of the time blocks 144. The adhoc capacity 156 can include a maximum number of vehicles that can enter a corresponding one of the roadway segments 114-114N without a reservation (i.e., adhoc). The adhoc capacity 156 can include capacity of the roadway segments 114-114N that is not available for reservation. If there is available capacity in the reservation capacity 152, the adhoc capacity 156 can correspondingly increase to accommodate additional adhoc users. Capacity can be specified by the RUM system 110 based upon a number of cars and time and can be a function of actual/expected average speed of vehicles and a number of available lanes in a given roadway segment.

Turning back to the user device 104, the user device 104 can execute, via the device processor 120, the roadway reservation application 126 to present a reservation user interface ("reserv. UI") 158 through which the user 102 can input reservation information 160 to be included in a reservation request 162 directed to the RUM system 110. The reservation information 160 can include a destination location and a destination arrival time. The destination location can include an address or a latitude/longitude pair for a destination to which the user 102 desires to travel. The destination arrival time can include a time at which the user 102 desires to arrive at the destination location. The destination arrival time can include a specific time (e.g., 1:35 PM) or a time range (e.g., 1:25-1:35 PM). The reservation information 160 can additionally include a number of passengers in the user vehicle 106 and/or an available passenger capacity of the user vehicle 106. The reservation information 160 can include one or more routes to the destination location. The route(s) can be generated by the navigation application 125 executed by the user device 104 or a cloud-based navigation application executed by cloud computing system.

The RUM system 110 can execute the RUM reservation management application 136 to handle reservation requests such as the reservation request 162. In particular, the RUM system 110 can receive the reservation request 162 from the user device 104. The RUM system 110 can execute the RUM reservation management application 136 to extract the reservation information 160 from the reservation request 162. The RUM system 110 can execute the RUM reservation management application 136 to generate a reservation response 164 that identifies one or more of the roadway segments 114, including the roadway segment entries 116-116N corresponding thereto, along with times at which the user 102 should arrive. The RUM system 110 can send the reservation response 164 to the user device 104. The user device 104, in response, can present, via the reservation UI 158, a prompt through which the user 102 can accept or deny the reservation. In response to an acceptance of the reservation, the user device 104 can generate and send a reservation acceptance message 166 to the RUM system 110. The RUM system 110, in response, can execute the RUM reservation management application 136 to generate a reservation certificate 170 and can send the reservation certificate 170 to the user device 104. The user device 104 can store the reservation certificate 170 (e.g., in the device memory 122) for presentation to the RUM system 110 when the user vehicle 106 arrives at the roadway segment entry of the roadway segment that identifies the start of the reservation. In response to a denial of the reservation, the user device 104 can generate and send a reservation denial message 168 to the RUM system 110.

The user device 104 can execute, via the device processor 120, the adhoc application 128 to present an adhoc user interface ("adhoc UI") 172 through which the user 102 can input adhoc entry information 174 to be included in an adhoc entry request 176 directed to the RUM system 110. The adhoc entry information 174 can identify one or more of the roadway segments 114-114N the user 102 desires to travel along without having a prior reservation.

The RUM system 110 can receive the adhoc entry request 176 from the user device 104. The RUM system 110 can execute the RUM adhoc management application 138 to extract the adhoc entry information 174 from the adhoc entry request 176. The RUM system 110 can execute the RUM adhoc management application 138 to determine if there is capacity available for the one or more roadway segments 114-114N identified in the adhoc entry information 174 to accommodate the adhoc entry request 176. If the RUM system 110 determines that there is capacity to accommodate the adhoc entry request 176, the RUM system 110 can execute the RUM adhoc management application 138 to generate an adhoc entry response 178, including a grant of access to the one or more of roadway segments 114-114N identified in the adhoc entry information 174, and can send the adhoc entry response 178 to the user device 104. If, however, the RUM system 110 determines that there is no capacity to accommodate the adhoc entry request 176, the RUM system 110 can execute the RUM adhoc management application 138 to generate the adhoc entry response 178, including a denial of access to the one or more of roadway segments 114-114N identified in the adhoc entry information 174, and can send the adhoc entry response 178 to the user device 104.

It should be understood that some implementations of the operating environment 100 include multiple users 102, multiple user devices 104, multiple user vehicles 106, multiple networks 108, multiple RUM systems 110, multiple device processors 120, multiple device memories 122, multiple device operating system 124, multiple roadway reservation applications 126, multiple reservation UIs 158, multiple adhoc applications 128, multiple adhoc UIs 172, multiple RUM processors 130, multiple RUM memories 132, multiple RUM operating systems 134, multiple RUM reservation management applications 136, multiple RUM adhoc management applications 138, multiple roadway usage databases 140, or some combination thereof. Thus, the illustrated embodiment should be understood as being illustrative, and should not be construed as being limiting in any way.

Figure 2:
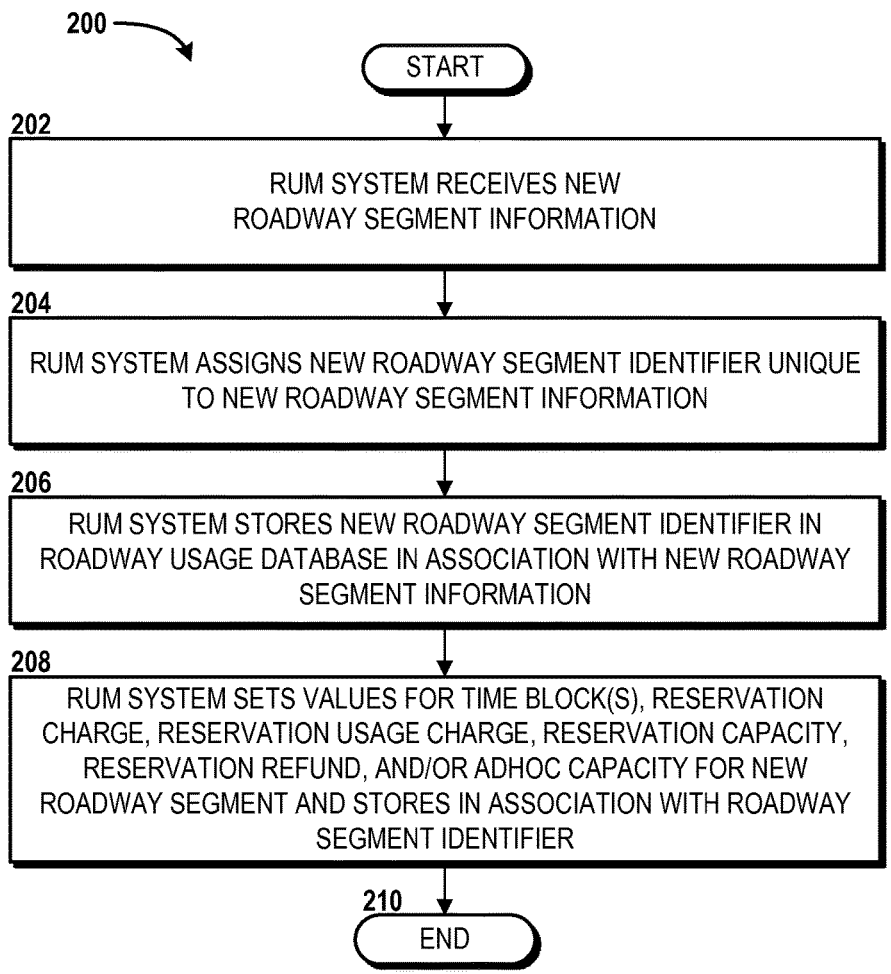
FIG. 2 is a flow diagram illustrating aspects of a method for establishing a database entry for a new roadway segment, according to an illustrative embodiment of the concepts and technologies disclosed herein.

Turning now to FIG. 2, a flow diagram illustrating aspects of a method 200 for establishing a database entry for a new roadway segment will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the user device 104, the RUM system 110, and/or one or more other computing systems and/or devices disclosed herein to perform operations.

For purposes of illustrating and describing some of the concepts of the present disclosure, the methods disclosed herein are described as being performed, at least in part, by the user device 104 and the RUM system 110 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins and proceeds to operation 202, where the RUM system 110 receives new roadway segment information associated with a new roadway segment to be managed by the RUM system 110. The new physical roadway segment information can include a roadway name, a roadway location, a roadway length, and any other information about the new roadway segment. The new roadway segment information can be input into the RUM system 110 directly or through a remote computer system (not shown).

From operation 202, the method 200 proceeds to operation 204, where the RUM system 110 assigns a new roadway segment identifier that is unique to the new physical roadway segment information. The new roadway segment identifier can be any combination of letters, numbers, symbols, or characters. From operation 204, the method 200 proceeds to operation 206, where the RUM system 110 stores the new roadway segment identifier in association with the new physical roadway segment information in the roadway usage database 140. From operation 206, the method 200 proceeds to operation 208, where the RUM system 110 sets values for the time block(s) 144, the reservation fee 148, the reservation usage fee 150, the reservation capacity 152, the reservation refund 154, and/or the adhoc capacity 156 for the new physical roadway segment. Also at operation 208, the RUM system 110 stores these values in the roadway usage database 140 in association with the new roadway segment identifier. From operation 208, the method 200 proceeds to operation 210, where the method 200 ends.

Figure 3A:
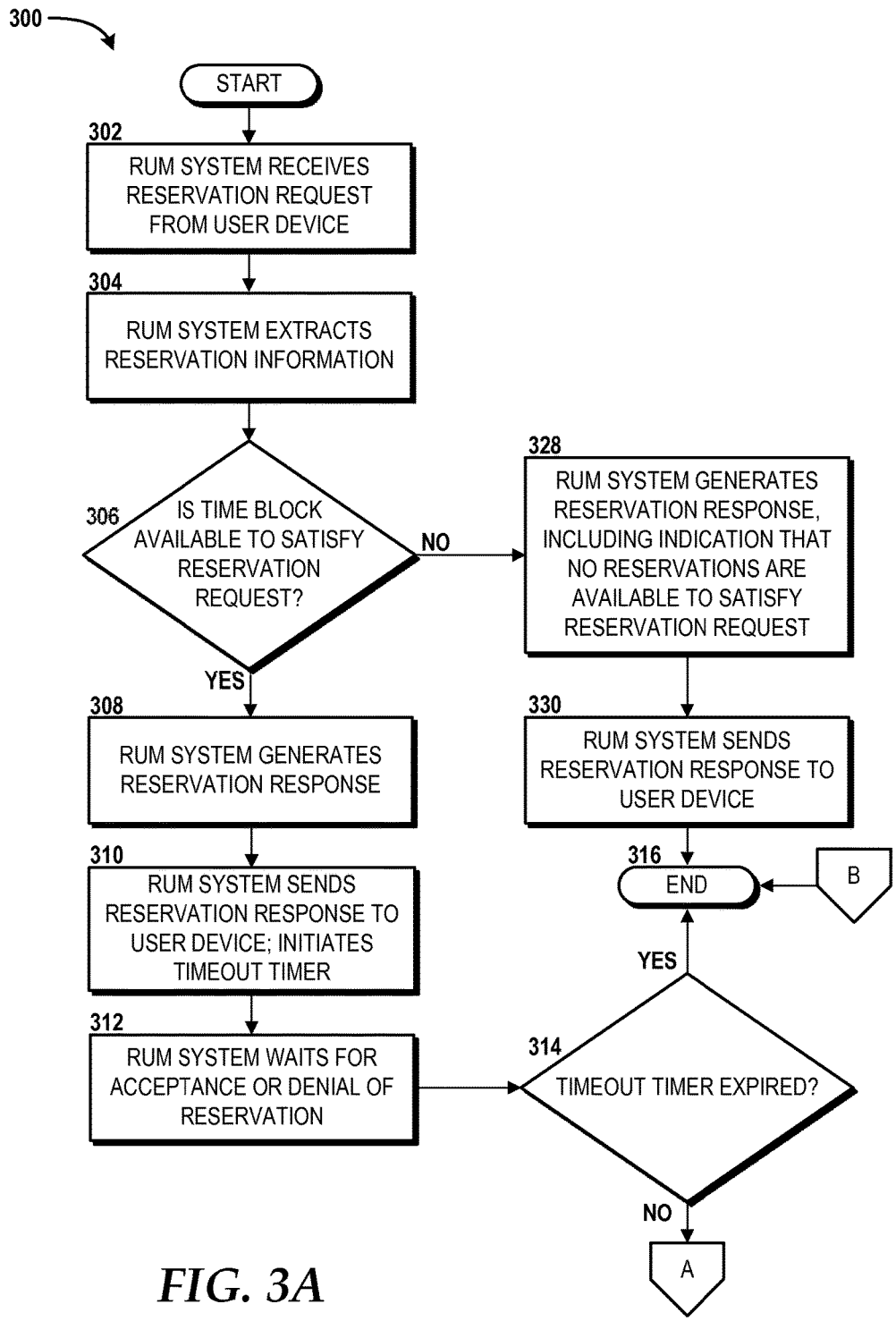
FIGS. 3A-3B are flow diagrams illustrating aspects of a method for processing a reservation request, according to an illustrative embodiment of the concepts and technologies disclosed herein.
Figure 3B:
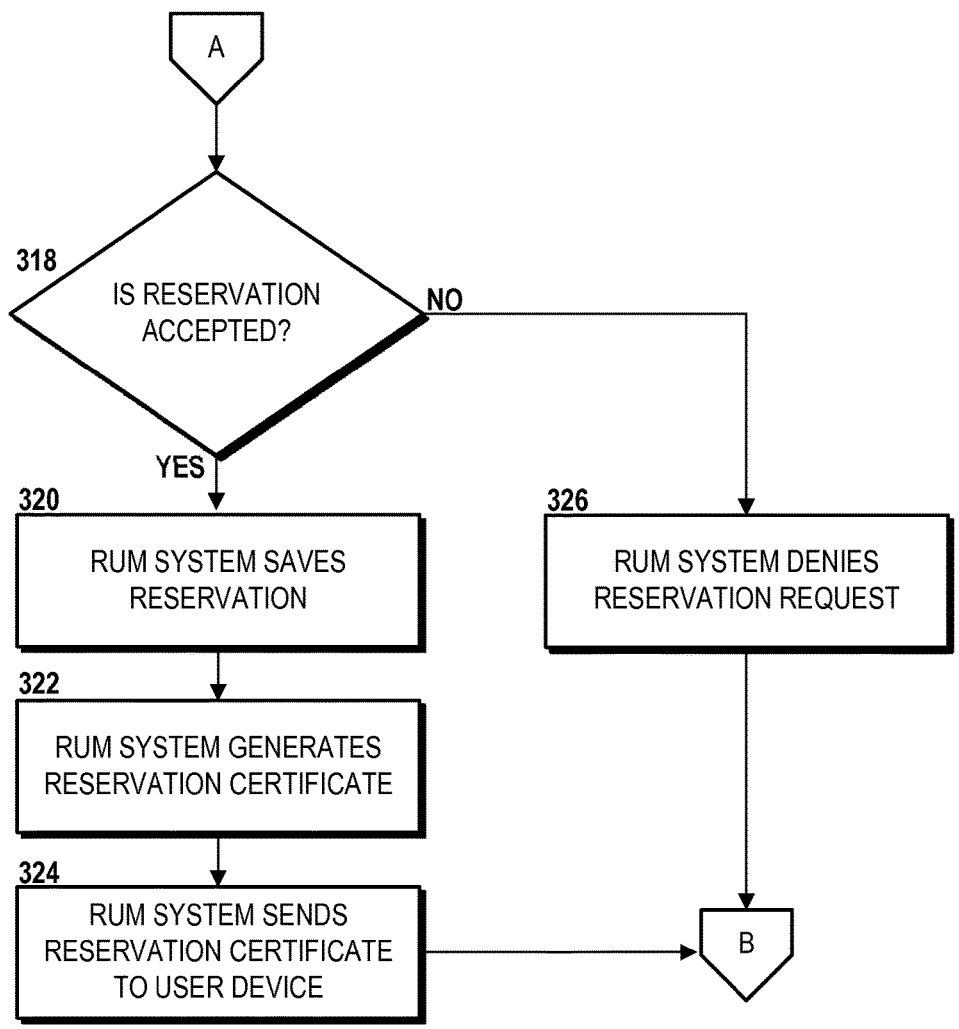

Turning now to FIGS. 3A and 3B, a method 300 for processing a reservation request, such as the reservation request 162, will be described, according to an illustrative embodiment. The method 300 will be described with reference to FIGS. 3A-3B and further reference to FIG. 1. The method 300 will be described from the perspective of the RUM system 110 executing, via the RUM processor 130, the RUM reservation management application 136.

The method 300 begins in FIG. 3A and proceeds to operation 302, where the RUM system 110 receives the reservation request 162 from the user device 104. From operation 302, the method 300 proceeds to operation 304, where the RUM system 110 extracts the reservation information 160 from the reservation request 162. The reservation information 160 can include a destination location and a destination arrival time. The destination location can include an address or a latitude/longitude pair for a destination to which the user 102 desires to travel. The destination arrival time can include a time at which the user 102 desires to arrive at the destination location. The destination arrival time can include a specific time (e.g., 1:35 PM) or a time range (e.g., 1:25-1:35 PM). The reservation information 160 can include at least a portion of one or more routes to the destination location. As used herein, a portion of a route can include one or more of the roadway segments 114-114N. The route(s) can be generated by the navigation application 125 executed by the user device 104 or a cloud-based navigation application executed by cloud computing system. The RUM system 110 can utilize the route(s) to identify, via one or more of the roadway segment identifiers 142, one or more of the roadway segments 114-114N to be used for travel to the destination location along with one or more of the time blocks 144 associated with the roadway segment identifiers 142.

In some embodiments, the RUM system 110 receives a set of roadway segments that comprise a route, but the RUM system 110 considers each roadway segment independently and does not consider any association among the roadway segments to form the route. In some other embodiments, the RUM system 110 has intelligence to receive a route and extract each roadway segment that constitutes a portion of the route. Moreover, roadway segments might be received piecemeal or with alternatives segments for one or more portions of a route.

From operation 304, the method 300 proceeds to operation 306, where the RUM system 110 determines if at least one time block is available to satisfy the reservation request 162. If at least one time block is available to satisfy the reservation request 162, the method 300 proceeds to operation 308, where the RUM system 110 generates the reservation response 164, including the time block(s) available to satisfy the reservation request 162. From operation 308, the method 300 proceeds to operation 310, where the RUM system 110 sends the reservation response 164 to the user device 104. Additionally, at operation 310, the RUM system 110 initiates a timeout timer (not shown in FIG. 1). The timeout timer can specify a time period during which the user 102 has an opportunity to respond to the reservation response 164 with an acceptance or a denial of the reservation. From operation 310, the method 300 proceeds to operation 312, where the RUM system 110 waits for acceptance, via the reservation acceptance message 166, or denial, via the reservation denial message 168, from the user device 104. From operation 312, the method 300 proceeds to operation 314, where the RUM system 110 determines whether the timeout timer has expired. If the timeout timer has expired, the method 300 proceeds to operation 316, where the method 300 ends. If the timeout timer has not expired, the method 300 proceeds to operation 318 shown in FIG. 3B.

Turning now to FIG. 3B, and particularly to operation 318, where the RUM system 110 determines whether the reservation was accepted based upon the receipt of the reservation acceptance message 166 or the reservation denial message 168. If the RUM system 110 determines, at operation 318, that the reservation was accepted (i.e., the reservation acceptance message 166 was received), the method 300 proceeds from operation 318 to operation 320. At operation 320, the RUM system 110 saves the reservation in the roadway usage database 140. The saving operation (operation 320) can include marking the time block 144 as reserved and decrementing a remaining portion of the utilization (i.e., the reservation capacity 152) associated with the time block 144 accordingly. From operation 320, the method 300 proceeds to operation 322, where the RUM system 110 generates the reservation certificate 170. From operation 322, the method 300 proceeds to operation 324, where the RUM system 110 sends the reservation certificate 170 to the user device 104. From operation 324, the method 300 proceeds to operation 316 (FIG. 3A), where the method 300 ends. If, however, at operation 318, the RUM system 110 determines that the reservation was not accepted (i.e., the reservation denial message 168 was received), the method 300 proceeds to operation 326, where the RUM system 110 denies the reservation request 162. In some embodiments, the RUM system 110 can notify the user device 104 that the reservation request 162 was denied. The notification can be or can include a text message, an email, a call, an application notification (e.g., generated by the roadway reservation application 126 in response to the RUM system 110 denying the reservation request 162), and/or the like. From operation 326, the operation proceeds to operation 316 (FIG. 3A), where the method 300 ends.

Turning back to FIG. 3A, and specifically to operation 306, if the RUM system 110 determines that no time blocks are available to satisfy the reservation request 162, the method 300 proceeds to operation 328, where the RUM system 110 generates the reservation response 164, including an indication that no reservations are available to satisfy the reservation request 162. From operation 328, the method 300 proceeds to operation 330, where the RUM system 110 sends the reservation response 164 to the user device 104. From operation 330, the method 300 proceeds to operation 316, where the method 300 ends.

Figure 4:
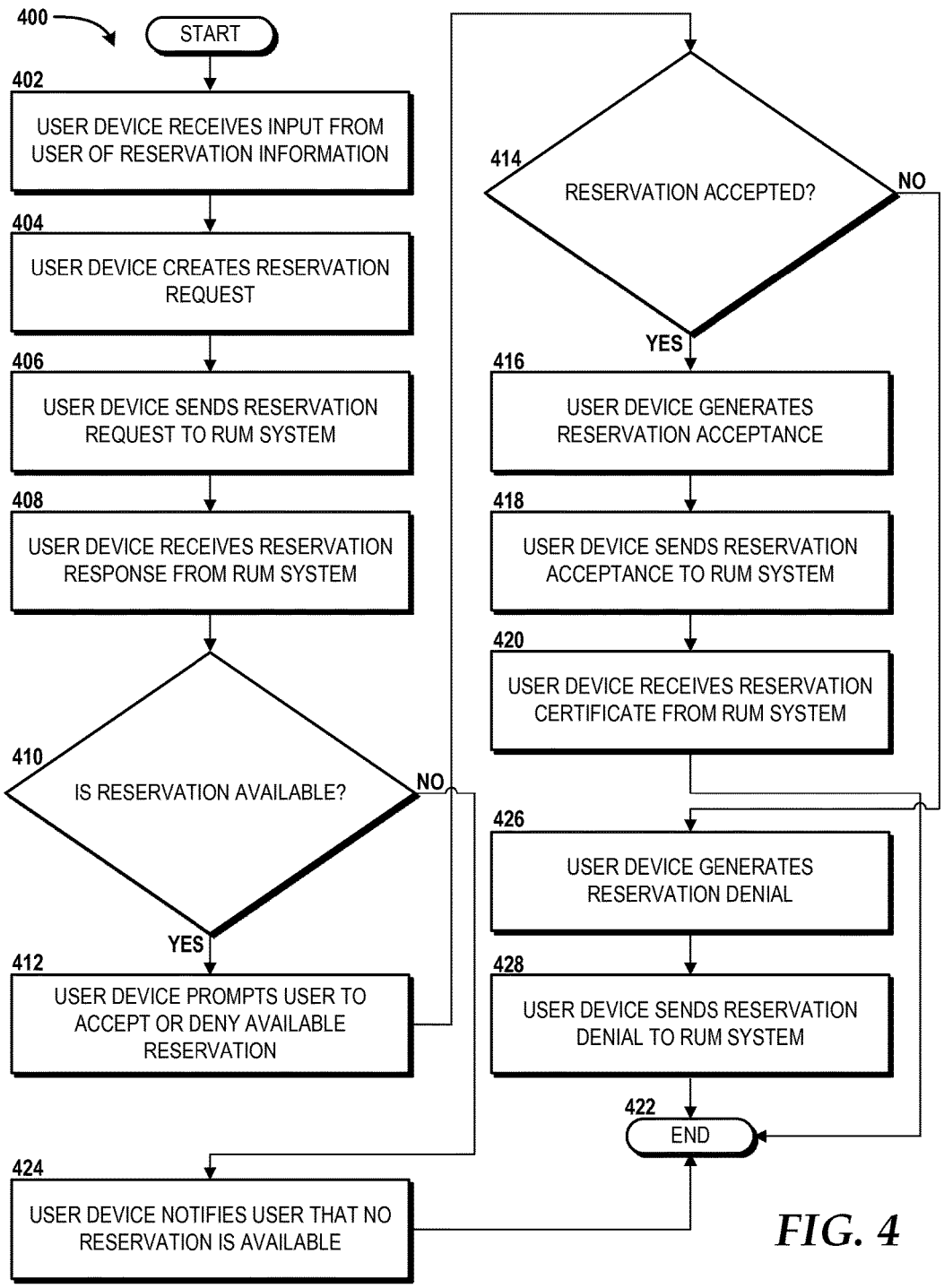
FIG. 4 is a flow diagram illustrating aspects of a method for placing a reservation to utilize at least a portion of a roadway, according to an illustrative embodiment of the concepts and technologies disclosed herein.

Turning now to FIG. 4, a method 400 for placing a reservation to utilize at least a portion of the roadways 112 will be described, according to an illustrative embodiment. The method 400 will be described with reference to FIG. 4 and further reference to FIG. 1. Moreover, the method 400 will be described from the perspective of the user device 104 executing, via the device processor 120, the navigation application 125 and the roadway reservation application 126.

The method 400 begins and proceeds to operation 402, where the user device 104 receives input from the user 102 of the reservation information 160 to reserve one or more of the roadway segments 114-114N. The reservation information 160 can include a destination location and a destination arrival time. The destination location can include an address or a latitude/longitude pair for a destination to which the user 102 desires to travel. The destination arrival time can include a time at which the user 102 desires to arrive at the destination location. The destination arrival time can include a specific time (e.g., 1:35 PM) or a time range (e.g., 1:25-1:35 PM). The reservation information 160 can additionally include a number of passengers in the user vehicle 106 and/or an available passenger capacity of the user vehicle 106. The reservation information 160 can include one or more routes to the destination location. The route(s) can be generated by the navigation application 125 executed by the user device 104 or a cloud-based navigation application executed by cloud computing system. From operation 402, the method 400 proceeds to operation 404, where the user device 104 creates the reservation request 162. From operation 404, the method 400 proceeds to operation 406, where the user device 104 sends the reservation request 162 to the RUM system 110.

From operation 406, the method 400 proceeds to operation 408, where the user device 104 receives the reservation response 164 from the RUM system 110. From operation 408, the method 400 proceeds to operation 410, where the user device 104 determines, based upon the reservation response 164, whether a reservation is available to satisfy the reservation request 162. If, at operation 410, the user device 104 determines that a reservation is available to satisfy the reservation request 162, the method 400 proceeds to operation 412, where the user device 104 prompts the user 102 to accept or deny the available reservation. From operation 412, the method 400 proceeds to operation 414, where the user device 104 determines whether the reservation was accepted based upon input received from the user 102. If the reservation was accepted, the method 400 proceeds to operation 416, where the user device 104 generates the reservation acceptance 166. From operation 416, the method 400 proceeds to operation 418, where the user device 104 sends the reservation acceptance 166 to the RUM system 110. From operation 418, the method 400 proceeds to operation 420, where the user device 104 receives the reservation certificate 170 from the RUM system 110. From operation 420, the method 400 proceeds to operation 422, where the method 400 ends.

If the user device 104 determines, at operation 410 that a reservation is not available, the method 400 proceeds to operation 424, where the user device 104 notifies the user 102 that no reservation is available to satisfy the reservation request 162. From operation 424, the method 400 proceeds to operation 422, where the method 400 ends. If the user device 104 determines that the reservation was not accepted at operation 414, the method 400 proceeds to operation 426, where the user device 104 generates the reservation denial message 168. From operation 426, the method 400 proceeds to operation 428, the user device 104 sends the reservation denial message 168 to the RUM system 110. From operation 428, the method 400 proceeds to operation 422, where the method 400 ends.

Figure 5:
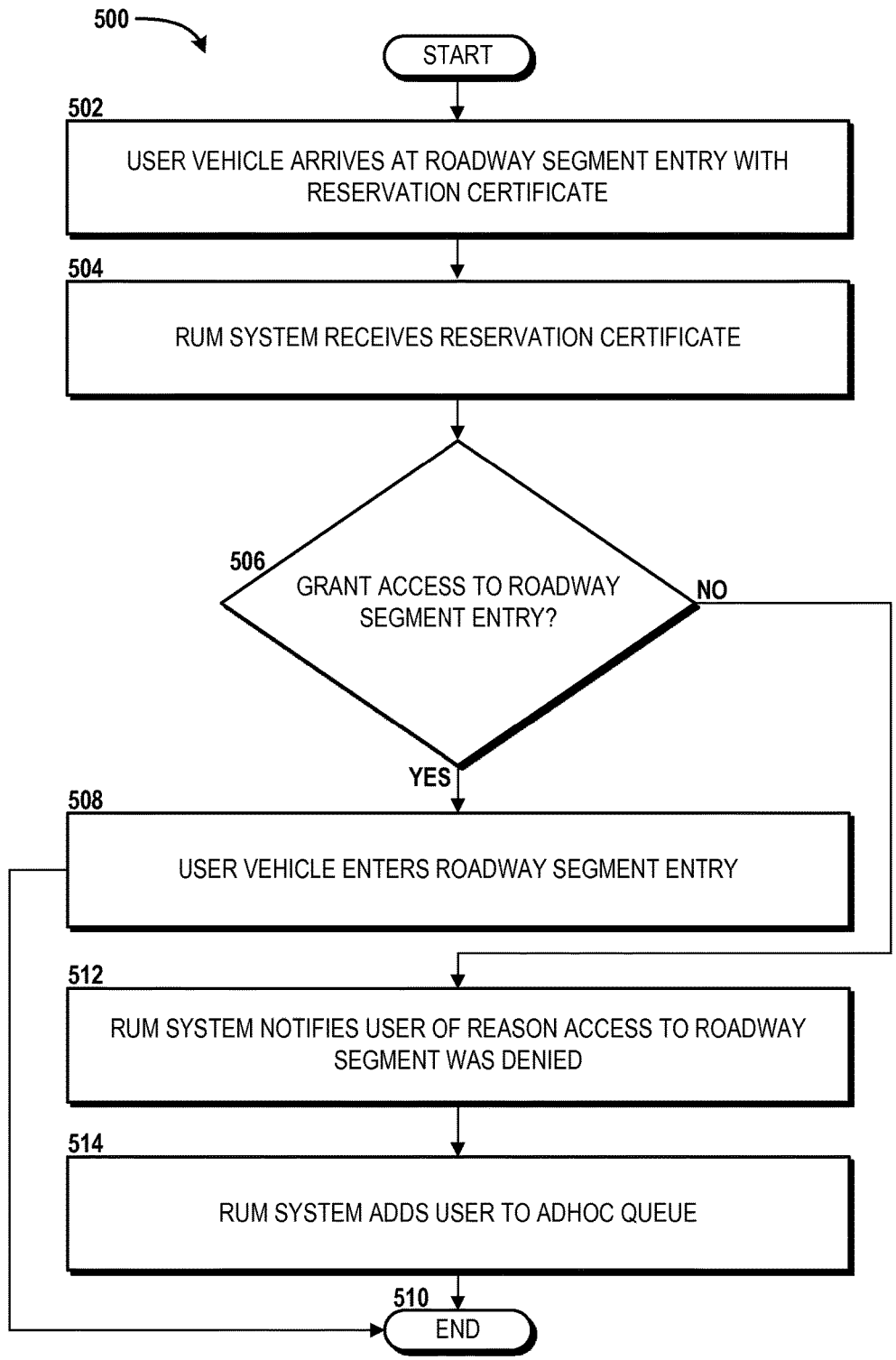
FIG. 5 is a flow diagram illustrating aspects of a method for redeeming a reservation certificate for a reservation to utilize at least a portion of a roadway, according to an illustrative embodiment of the concepts and technologies disclosed herein.

Turning now to FIG. 5, a method 500 for redeeming the reservation certificate 170 will be described, according to an illustrative embodiment. The method 500 will described with reference FIG. 5 and further reference to FIG. 1. Moreover, the method 500 will be described from the perspective of the RUM system 110 executing, via the RUM processor 130, the RUM reservation management application 136.

The method 500 begins and proceeds to operation 502, where the user vehicle 106 arrives at one of the roadway segment entries 116-116N with the reservation certificate 170. From operation 502, the method 500 proceeds to operation 504, where the RUM system 110 receives the reservation certificate 170 from the user device 104 via the network 108. From operation 504, the method 500 proceeds to operation 506, where the RUM system 110 determines whether to grant access to the roadway segment entry based upon the reservation certificate 170. In particular, the RUM system 110 can analyze the reservation certificate 170 for its authenticity, including whether the RUM system 110 actually issued the certificate and whether the current time matches the reservation time (time block) allocated during the reservation making process described above with reference to FIGS. 3A, 3B, and 4. If the RUM system 110 determines to grant access to the roadway segment entry based upon the reservation certificate 170, the method 500 proceeds to operation 508, where the user vehicle 106 enters the roadway segment entry. From operation 508, the method 500 proceeds to operation 510, where the method 500 ends.

If, however, at operation 506, the RUM system 110 determines to deny access to the roadway segment entry, the method 500 proceeds to operation 512, where the RUM system 110 notifies the user 102 of a reason access to the roadway segment was denied. For example, the RUM system 110 can notify the user 102 that the reservation certification 170 has expired (i.e., the user 102 missed the window in which to redeem the reservation). Other reasons that the RUM system 110 might deny access to the roadway segment include, but are not limited to, the reservation certification 170 not being authentic. If the reservation certification 170 is authentic but access to the roadway segment is denied for another reason (e.g., expiration of the reservation certification 170), the RUM system 110, at operation 514, can add the user 102 to an adhoc queue. From operation 514, the method 500 proceeds to operation 510, where the method 500 ends.

Figure 6:
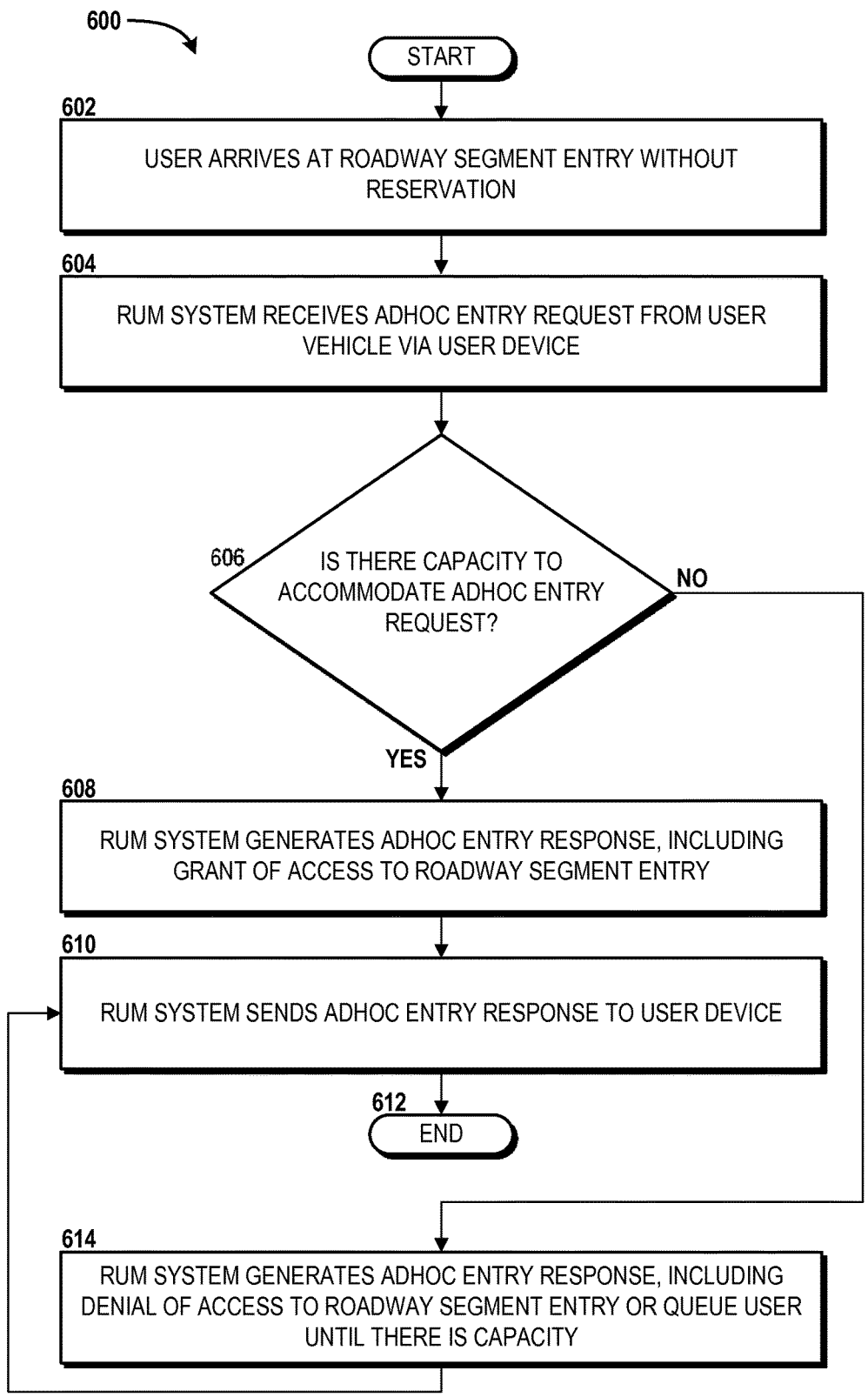
FIG. 6 is a flow diagram illustrating aspects of a method for managing adhoc requests, according to an illustrative embodiment of the concepts and technologies disclosed herein.

Turning now to FIG. 6, a method 600 for managing adhoc requests by the RUM system 110 will be described, according to an illustrative embodiment. The method 600 will be described herein with reference to FIG. 6 and with further reference to FIG. 1. Moreover, the method 600 will be described from the perspective of the RUM system 110 executing, via the RUM processor 130, the RUM adhoc management application 138.

The method 600 begins and proceeds to operation 602, where the user 102 arrives at a roadway segment entry without a reservation. Alternatively, the user 102 might have a reservation but his or her reservation certificate has expired. In this case, the RUM system 110 might prioritize in some manner the user 102 over other users in the queue. From operation 602, the method 600 proceeds to operation 604, where the RUM system 110 receives the adhoc entry request 176 from the user vehicle 106 via the user device 104. From operation 604, the method 600 proceeds to operation 606, where the RUM system 110 determines whether there is capacity (i.e., the adhoc capacity 156 is not at a maximum value) to accommodate the adhoc entry request 176. If the RUM system 110 determines that there is capacity to accommodate the adhoc entry request 176, the method 600 proceeds to operation 608, where the RUM system 110 generates the adhoc entry response 178, including a grant of access to the roadway segment entry. From operation 608, the method 600 proceeds to operation 610, where the RUM system 110 sends the adhoc entry response 178 to the user device 104. From operation 610, the method 600 proceeds to operation 612, where the method 600 ends. If, however, at operation 606, the RUM system 110 determines that there is no capacity to accommodate the adhoc entry request 178, the method 600 proceeds to operation 614, where the RUM system 110 generates the adhoc entry response 176, including a denial of access to the roadway segment entry. From operation 614, the method 600 proceeds to operation 610, where the RUM system 110 sends the adhoc entry response 178 to the user device 104. From operation 610, the method 600 proceeds to operation 612, where the method 600 ends.

Figure 7:
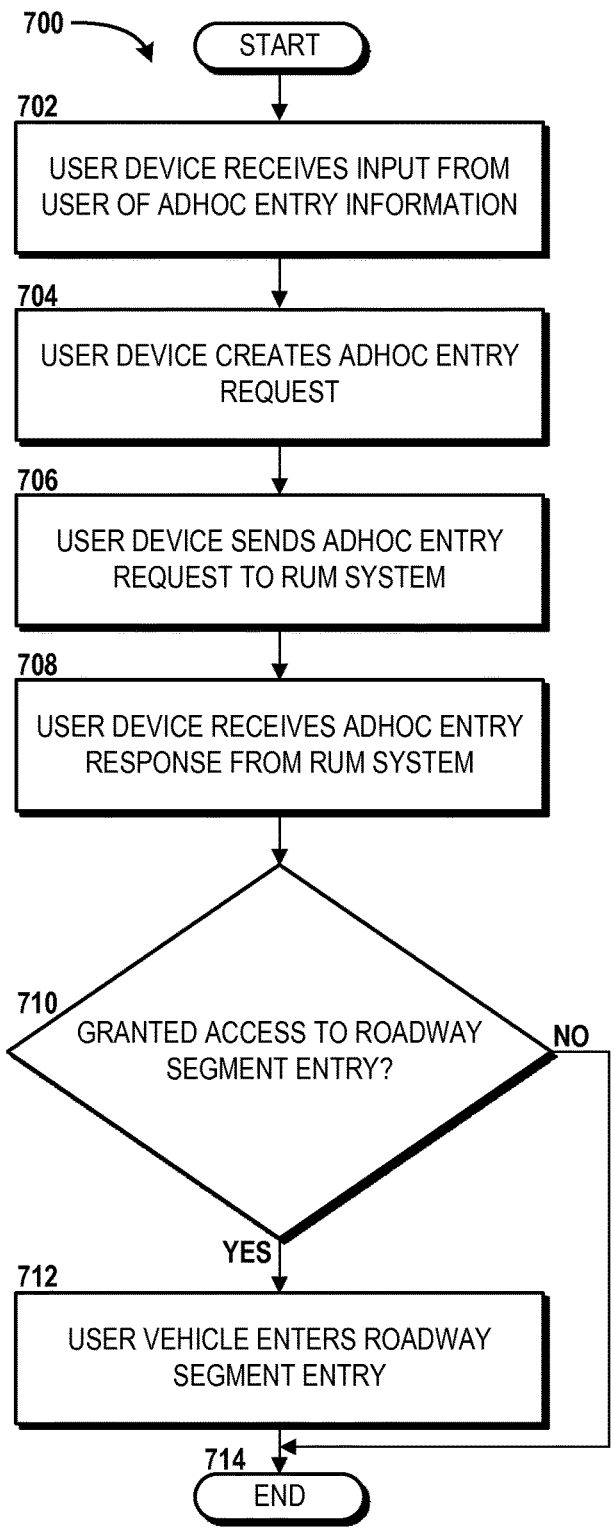
FIG. 7 is a flow diagram illustrating aspects of a method for requesting adhoc entry to a roadway segment, according to an illustrative embodiment of the concepts and technologies disclosed herein.

Turning now to FIG. 7, a method 700 for requesting adhoc entry to a roadway segment will be described, according to an illustrative embodiment. The method 700 will be described with reference to FIG. 7 and further reference to FIG. 1. Moreover, the method 700 will be described from the perspective of the user device 104 executing, via the device processor 120, the adhoc application 128.

The method 700 begins and proceeds to operation 702, where the user device 104 receives input from the user 102 of the adhoc entry information 174. From operation 702, the method 700 proceeds to operation 704, where the user device 104 creates the adhoc entry request 176 from the input received at operation 702. From operation 704, the method 700 proceeds to operation 706, where the user device 104 sends the adhoc entry request 176 to the RUM system 110. From operation 706, the method 700 proceeds to operation 708, where the user device 104 receives the adhoc entry response 178 from the RUM system 110. From operation 708, the method 700 proceeds to operation 710, where if the user vehicle 106 is granted access to the roadway entry segment, the method 700 proceeds to operation 712, where the user vehicle 106 enters the roadway segment entry. From operation 712, the method 700 proceeds to operation 714, where the method 700 ends. If, however, at operation 710, the user vehicle 106 is denied access to the roadway entry segment, the method 700 proceeds to operation 714, where the method 700 ends.

Figure 8:
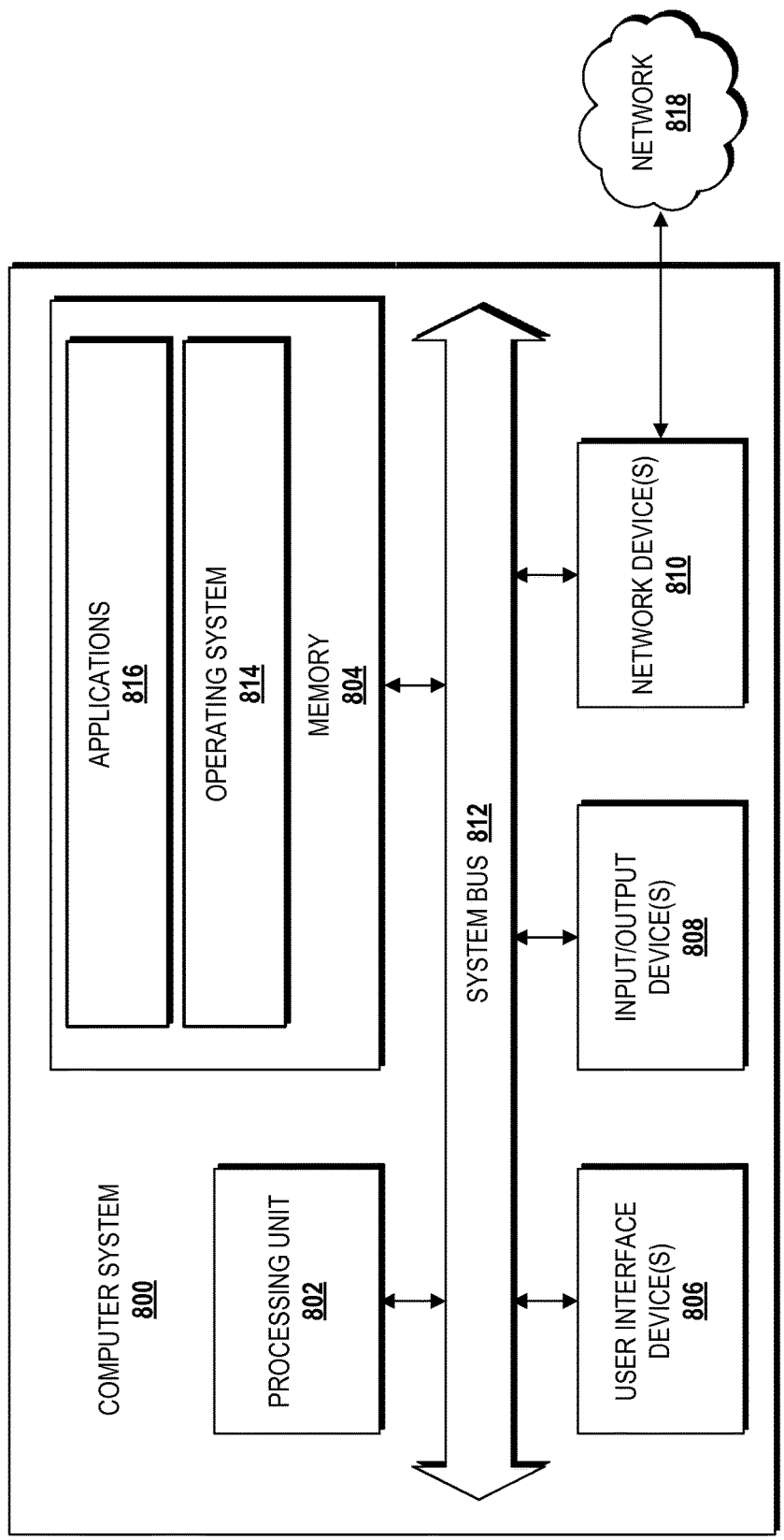
FIG. 8 is a block diagram illustrating an example computer system capable of implementing aspects of the embodiments presented herein.

FIG. 8 is a block diagram illustrating a computer system 800 configured to perform various operations disclosed herein. The computer system 800 includes a processing unit 802, a memory 804, one or more user interface devices 804, one or more input/output ("I/O") devices 808, and one or more network devices 810, each of which is operatively connected to a system bus 812. The system bus 812 enables bi-directional communication between the processing unit 802, the memory 804, the user interface devices 804, the I/O devices 808, and the network devices 810. In some embodiments, the user device 104, one or more components of the user vehicle 106, the network 108, one or more components of the network 108, the RUM system 110, or some combination thereof is/are configured, at least in part, like the computer system 800. It should be understood, however, that the user device 104, one or more components of the user vehicle 106, the network 108, one or more components of the network 108, the RUM system 110 may include additional functionality or include less functionality than now described.

The processing unit 802 (e.g., the device processor or the RUM processor 130) may be a standard central processor that performs arithmetic and logical operations, a more specific purpose programmable logic controller ("PLC"), a programmable gate array, or other type of processor known to those skilled in the art and suitable for controlling the operation of the computer system 800. Processing units are generally known, and therefore are not described in further detail herein.

The memory 804 (e.g., the RUM processor 130 or the RUM memory 132) communicates with the processing unit 802 via the system bus 812. In some embodiments, the memory 804 is operatively connected to a memory controller (not shown) that enables communication with the processing unit 802 via the system bus 812. The illustrated memory 804 includes an operating system 814 (e.g., the device operating system 124 or the RUM operating system 134) and one or more applications 814 (e.g., the navigation application 125, the roadway reservation application 126, the adhoc application 128, the RUM reservation management application 136, or the RUM adhoc management application 138).

The operating system 814 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 804 may include one or more devices with which a user accesses the computer system 800. The user interface devices 804 may include, but are not limited to, computers, servers, personal digital assistants, telephones (e.g., cellular, IP, or landline), or any suitable computing devices. The I/O devices 808 enable a user to interface with the program modules. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, a touchscreen, or an electronic stylus. Further, the I/O devices 808 may include one or more output devices, such as, but not limited to, a display screen or a printer.

The network devices 810 enable the computer system 800 to communicate with other networks or remote systems via a network 818 (e.g., the network 108). Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a WLAN such as a WI-FI network, a WWAN, a wireless PAN ("WPAN") such as BLUETOOTH, or a wireless MAN ("WMAN"). Alternatively, the network 818 may be a wired network such as, but not limited to, a WAN such as the Internet, a LAN such as the Ethernet, a wired PAN, or a wired MAN.

Figure 9:
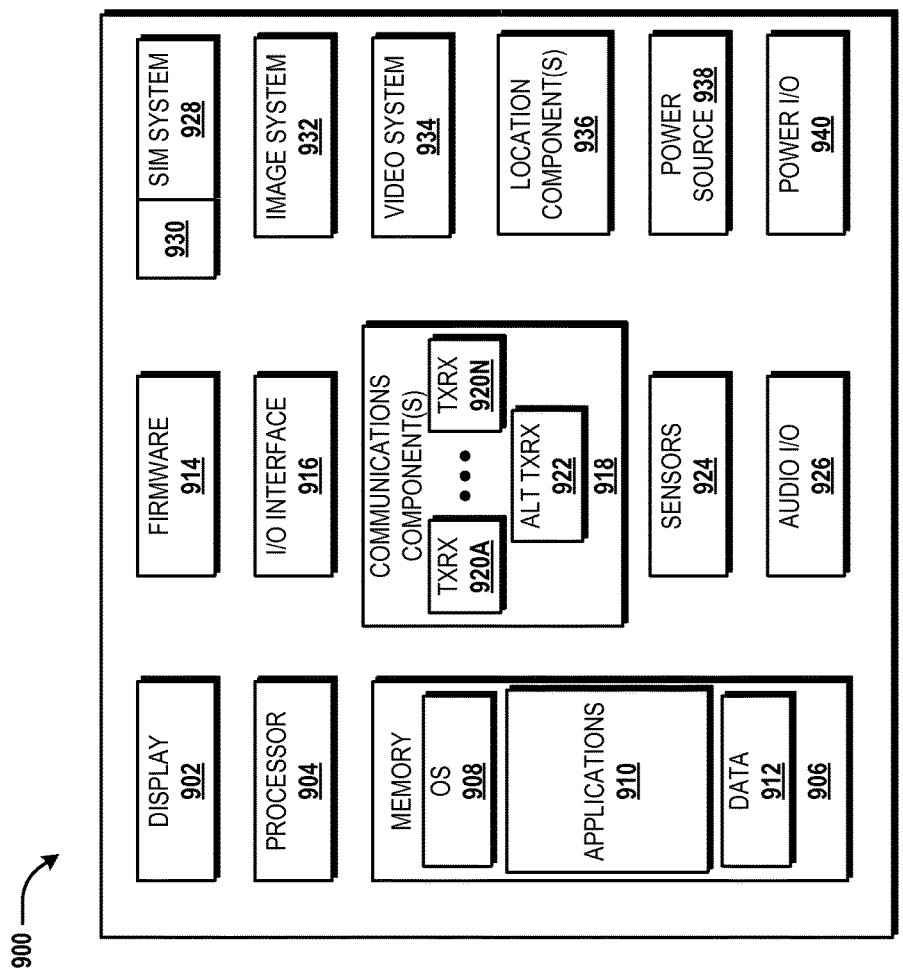
FIG. 9 is a block diagram illustrating an example mobile device capable of implementing aspects of the embodiments disclosed herein.

Turning now to FIG. 9, an illustrative mobile device 900 and components thereof will be described. In some embodiments, the user device 104 and/or the RUM system 110 described above with reference to FIG. 1 can be configured as and/or can have an architecture similar or identical to the mobile device 900 described herein in FIG. 9. It should be understood, however, that the user device 104 and/or the RUM system 110 may or may not include the functionality described herein with reference to FIG. 9. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display network connection information, various graphical user interface ("GUI") elements (e.g., GUI elements of the reservation UI 158 and the adhoc UI 172), text, images, video, virtual keypads and/or keyboards, messaging data, notification messages, metadata, Internet content, device status, time, date, calendar data, device preferences, map and location data, combinations thereof, and/or the like. The mobile device 900 also can include a processor 904 (e.g., the device processor 120 or the RUM processor 130) and a memory or other data storage device ("memory") 906 (e.g., the device memory 122 or the RUM memory 132). The processor 904 can be configured to process data and/or can execute computer-executable instructions stored in the memory 906. The computer-executable instructions executed by the processor 904 can include, for example, an operating system 908 (e.g., the device operating system 124 or the RUM operating system 134), one or more applications 910, which may include the navigation application 125, roadway reservation application 126, the adhoc application 128, the RUM reservation management application 136, or the RUM adhoc management application 138, other computer-executable instructions stored in the memory 906, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in data communications, entering/deleting data, entering and setting user IDs and passwords for device access, configuring settings, manipulating content and/or settings, multimode interaction, interacting with other applications 910, and otherwise facilitating user interaction with the operating system 908, the applications 910, and/or other types or instances of data 912 that can be stored at the mobile device 900. The data 912 can include, for example, the reservation information 160, the adhoc entry information 174, the reservation certification 170, and/or other data.

The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interfaced 916 can be configured to support the input/output of data such as location information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 90b0 also can include a communications component 918. The communications component 918 can be configured to interface with the processor 904 to facilitate wired and/or wireless communications with one or more networks such as the network 108 described herein. In some embodiments, the communications component 918 includes a multimode communications subsystem for facilitating communications via the cellular network and one or more other networks.

The communications component 919, in some embodiments, includes one or more transceivers. The one or more transceivers, if included, can be configured to communicate over the same and/or different wireless technology standards with respect to one another. For example, in some embodiments, one or more of the transceivers of the communications component 918 may be configured to communicate using GSM, CDMAONE, CDMA2000, LTE, and various other 2G, 2.5G, 3G, 4G, 4.5G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 919 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/ WIMAX and/or cellular network triangulation data, combinations thereof, and the like. The location component 936 also can be configured to communicate with the communications component 919 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/ or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 900 or other devices or computers described herein, such as the computer system 900 described above with reference to FIG. 9. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 900 in order to store and execute the software components presented herein. It is also contemplated that the Mobile device 900 may not include all of the components shown in FIG. 9, may include other components that are not explicitly shown in FIG. 9, or may utilize an architecture completely different than that shown in FIG. 9.

Figure 10:
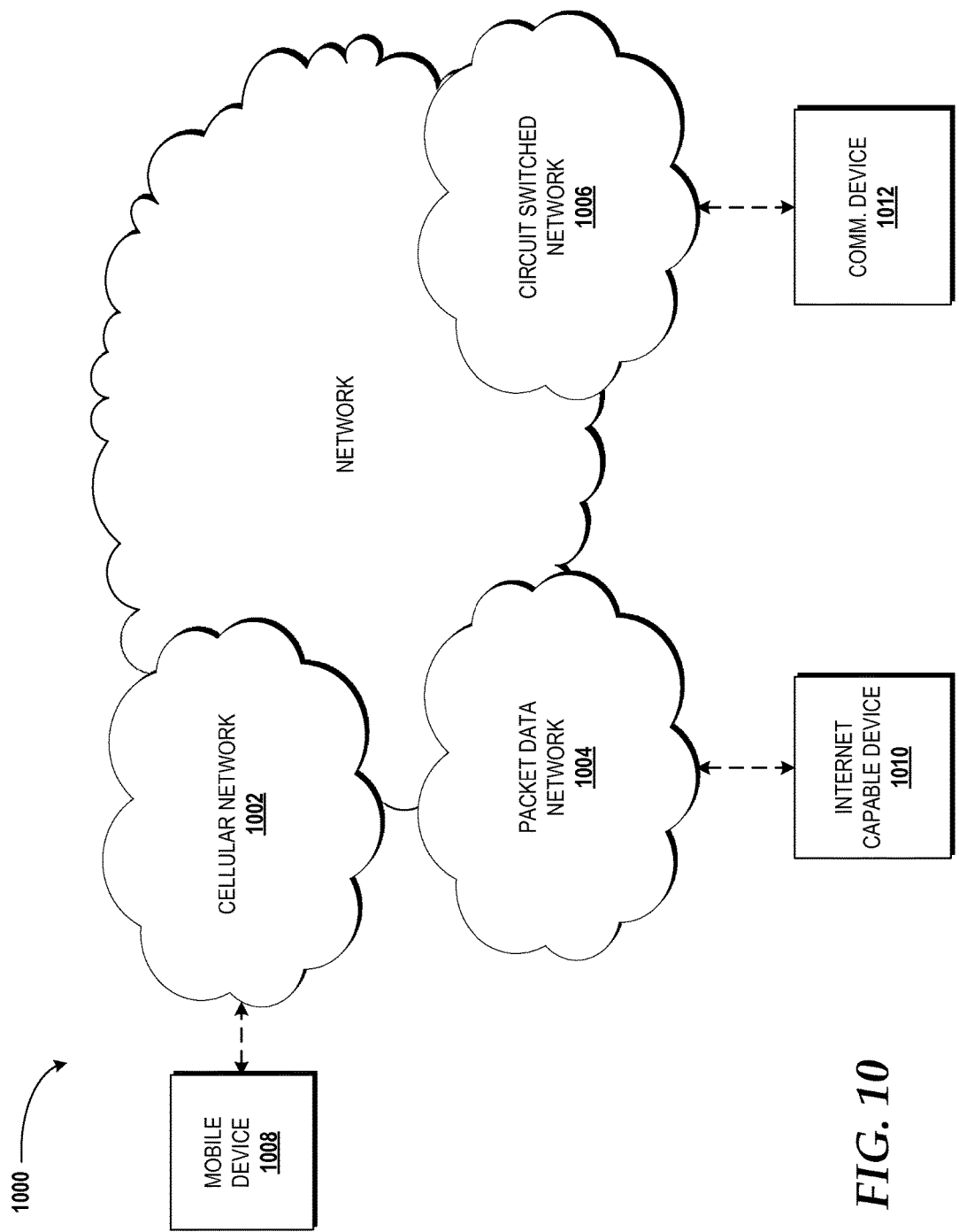
FIG. 10 is a diagram illustrating a network, according to an illustrative embodiment.

Turning now to FIG. 10, details of a network 1000 are illustrated, according to an illustrative embodiment. The network 1000 includes a cellular network 1002, a packet data network 1004, and a circuit switched network 1006 (e.g., a public switched telephone network). The network 1000 can include the network 108 illustrated and described with reference to FIG. 1.

The cellular network 1002 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, the user device 104, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSDPA), and HSPA+. The cellular network 1002 also is compatible with 4G mobile communications standards such as LTE, or the like, as well as evolved and future mobile standards.

The packet data network 1004 includes various devices, for example, servers, computers, databases, and other devices in communication with another, as is generally known. In some embodiments, the packet data network 1004 is or includes one or more WI-FI networks, each of which can include one or more WI-FI access points, routers, switches, and other WI-FI network components. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, the user device 104, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010.

Based on the foregoing, it should be appreciated that concepts and technologies for reservations-based intelligent roadway traffic management have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A system comprising:
   a roadway usage database comprising a roadway segment identifier that identifies a roadway segment, a time block associated with the roadway segment identifier, and a reservation capacity associated with the time block;
   a processor; and
   a memory that comprises computer-executable instructions that, when executed by the processor, cause the processor to perform operations comprising
      receiving, from a user device, a reservation request,
      extracting, from the reservation request, a route to a destination location, wherein the route comprises the roadway segment to be used by a user vehicle for travel to the destination location,
      determining the time block during which entry to the roadway segment is available,
      generating a reservation response comprising the time block available to satisfy the reservation request,
      sending the reservation response to the user device,
      receiving, from the user device, an acceptance or a denial of the reservation response, and
      in response to receiving the acceptance of the reservation response,
         marking, in the roadway usage database, the time block as reserved, and
         decrementing a remaining portion of the reservation capacity.

2. The system of claim 1, wherein the operations further comprise:
   generating a reservation certificate to be utilized by the user device to enter the roadway segment during the time block; and
   sending the reservation certificate to the user device.

3. The system of claim 1, wherein the roadway usage database also stores a reservation fee associated with the time block.

4. The system of claim 1, wherein the user vehicle comprises a partially autonomous vehicle or a fully autonomous vehicle.

5. The system of claim 1, wherein the roadway usage database further comprises an adhoc capacity for the roadway segment identifier; and wherein the operations further comprise:
   receiving, from a further user device, an adhoc entry request for entry to the roadway segment,
   determining whether the adhoc capacity can accommodate the adhoc entry request,
   in response to determining that the adhoc capacity can accommodate the adhoc entry request,
      generating an adhoc entry response comprising a grant of access for entry to the roadway segment, and
      sending the adhoc entry response to the user device.

6. The system of claim 1, further comprising storing, in the roadway usage database, a reservation usage fee associated with the time block.

7. The system of claim 6, wherein the reservation usage fee is fixed.

8. The system of claim 6, wherein the reservation usage fee is adjustable, based, at least in part, upon the reservation capacity.

9. A computer-readable storage medium having computer-executable instructions stored thereon that, when executed by a processor of a roadway usage management system, causes the roadway usage management system to perform operations comprising:
   receiving, from a user device, a reservation request;
   extracting, from the reservation request, a route to a destination location, wherein the route comprises a roadway segment to be used by a user vehicle for travel to the destination location;
   determining a time block during which entry to the roadway segment is available;
   generating a reservation response comprising the time block available to satisfy the reservation request;
   sending the reservation response to the user device;
   receiving, from the user device, an acceptance or a denial of the reservation response;
   storing, in a roadway usage database, a roadway segment identifier that identifies the roadway segment, wherein the time block is associated with the roadway segment identifier in the roadway usage database, and the time block is associated with a reservation capacity; and
   in response to receiving the acceptance of the reservation response,
      marking, in the roadway usage database, the time block as reserved, and
      decrementing a remaining portion of the reservation capacity.

10. The computer-readable storage medium of claim 9, wherein the operations further comprise:
    generating a reservation certificate to be utilized by the user device to enter the roadway segment during the time block; and
    sending the reservation certificate to the user device.

11. The computer-readable storage medium of claim 9, wherein the roadway usage database also stores a reservation fee associated with the time block.

12. The computer-readable storage medium of claim 9, wherein the operations further comprise:
    storing, in the roadway usage database, an adhoc capacity for the roadway segment identifier;
    receiving, from a further user device, an adhoc entry request for entry to the roadway segment,
    determining whether the adhoc capacity can accommodate the adhoc entry request,
    in response to determining that the adhoc capacity can accommodate the adhoc entry request,
       generating an adhoc entry response comprising a grant of access for entry to the roadway segment, and
       sending the adhoc entry response to the user device.

13. The computer-readable storage medium of claim 9, wherein the operations further comprise storing, in the roadway usage database, a reservation usage fee associated with the time block.

14. The computer-readable storage medium of claim 13, wherein the reservation usage fee is fixed.

15. The computer-readable storage medium of claim 13, wherein the reservation usage fee is adjustable based, at least in part, upon the reservation capacity.

16. A method comprising:
    receiving, by a roadway usage management system, from a user device, a reservation request;
    extracting, by the roadway usage management system, from the reservation request, a route to a destination location, wherein the route comprises a roadway segment to be used by a user vehicle for travel to the destination location;
    determining, by the roadway usage management system, a time block during which entry to the roadway segment is available;
    generating, by the roadway usage management system, a reservation response comprising the time block available to satisfy the reservation request;

sending, by the roadway usage management system, the reservation response to the user device;

receiving, by the roadway usage management system, from the user device, an acceptance or a denial of the reservation response;

storing, by the roadway usage management system, in a roadway usage database, a roadway segment identifier that identifies the roadway segment, wherein the time block is associated with the roadway segment identifier in the roadway usage database, and the time block is associated with a reservation capacity; and in response to receiving the acceptance of the reservation response,
- marking, in the roadway usage database, the time block as reserved, and
- decrementing a remaining portion of the reservation capacity.

17. The method of claim 16, further comprising:

generating a reservation certificate to be utilized by the user device to enter the roadway segment during the time block; and sending the reservation certificate to the user device.

18. The method of claim 16, further comprising storing, in the roadway usage database, a reservation fee associated with the time block.

19. The method of claim 16, further comprising storing, in the roadway usage database, a reservation usage fee associated with the time block.

20. The method of claim 16, further comprising:

storing, in the roadway usage database, an adhoc capacity for the roadway segment identifier;

receiving, from a further user device, an adhoc entry request for entry to the roadway segment, determining whether the adhoc capacity can accommodate the adhoc entry request, in response to determining that the adhoc capacity can accommodate the adhoc entry request,
- generating an adhoc entry response comprising a grant of access for entry to the roadway segment, and
- sending the adhoc entry response to the user device.

* * * * *